US012587631B2

(12) United States Patent
Loggins

(10) Patent No.: US 12,587,631 B2
(45) Date of Patent: Mar. 24, 2026

(54) MOTION DEPENDENT DISPLAY

(71) Applicant: APPLE INC., Cupertino, CA (US)

(72) Inventor: Benjamin Breckin Loggins, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 164 days.

(21) Appl. No.: 18/408,082

(22) Filed: Jan. 9, 2024

(65) Prior Publication Data

US 2024/0275938 A1 Aug. 15, 2024

Related U.S. Application Data

(60) Provisional application No. 63/484,817, filed on Feb. 14, 2023.

(51) Int. Cl.

| | |
|---|---|
| ***H04N 13/383*** | (2018.01) |
| ***G06F 3/01*** | (2006.01) |
| ***H04N 13/189*** | (2018.01) |
| ***H04N 13/398*** | (2018.01) |

(52) U.S. Cl.

CPC ........... *H04N 13/383* (2018.05); *G06F 3/012* (2013.01); *H04N 13/189* (2018.05); *H04N 13/398* (2018.05)

(58) Field of Classification Search

None

See application file for complete search history.

(56) References Cited

U.S. PATENT DOCUMENTS

| | | | | |
|---|---|---|---|---|
| 8,290,545 | B2 | 10/2012 | Terlizzi | |
| 8,803,800 | B2 * | 8/2014 | Zambrano | G06F 3/011 345/156 |
| 9,237,393 | B2 | 1/2016 | Abrahamsson et al. | |
| 10,015,620 | B2 | 7/2018 | Dillen et al. | |
| 10,524,040 | B2 | 12/2019 | Hajati et al. | |
| 11,044,544 | B2 | 6/2021 | Pong et al. | |
| 11,057,730 | B2 | 7/2021 | Karkkainen et al. | |
| 11,100,349 | B2 | 8/2021 | Cohen et al. | |
| 11,132,543 | B2 * | 9/2021 | Ranjan | G06N 3/096 |
| 2011/0128223 | A1 * | 6/2011 | Lashina | G06F 3/012 345/158 |
| 2012/0114132 | A1 | 5/2012 | Abrahamsson et al. | |

(Continued)

OTHER PUBLICATIONS

Sony, "ELF-SR1 Spatial Reality Display", https://pro.sony/ue_US/products/spatial-reality-displays/elf-srl, Downloaded Dec. 20, 2022 (16 pp).

(Continued)

*Primary Examiner* — Talha M Nawaz

(74) *Attorney, Agent, or Firm* — Young Basile Hanlon & MacFarlane, P.C.

(57) ABSTRACT

A method includes obtaining a first acceleration signal from a first acceleration sensor located in a first headphone device and obtaining a second acceleration signal from a second acceleration sensor located in a second headphone device. The method also includes determining a head orientation relative to a display screen based on the first acceleration signal and the second acceleration signal, controlling rendering of a three-dimensional scene based on the head orientation relative to the display screen, and outputting the three-dimensional scene for display on the display screen.

20 Claims, 6 Drawing Sheets

(56) References Cited

U.S. PATENT DOCUMENTS

| | | | | |
|---|---|---|---|---|
| 2014/0153751 | A1* | 6/2014 | Wells | H04S 7/304 381/74 |
| 2016/0011719 | A1* | 1/2016 | Andersson | G06F 3/0488 345/178 |
| 2017/0144042 | A1* | 5/2017 | Kanda | A61B 5/742 |
| 2017/0315614 | A1* | 11/2017 | Sullivan | G06F 3/013 |
| 2019/0070506 | A1 | 3/2019 | Stafford | |
| 2020/0053450 | A1* | 2/2020 | Pong | H04R 1/1008 |
| 2024/0061519 | A1* | 2/2024 | Lu | H04R 1/1016 |

OTHER PUBLICATIONS

Zabarauska, M., "Manfred Zabarauskas' Blog: 3D Display Simulation using Head-Tracking with Kinect", http://blog.manfredas.com/3d-display-simulation-using-head-tracking-with-microsoft-kinect, Oct. 31, 2012 (10 pp).

* cited by examiner

MOTION DEPENDENT DISPLAY

CROSS-REFERENCE TO RELATED APPLICATIONS

This application claims the benefit of U.S. Provisional Application No. 63/484,817, filed on Feb. 14, 2023, the contents of which are hereby incorporated by reference in their entirety herein for all purposes.

FIELD

The present disclosure relates generally to the field of display systems.

BACKGROUND

As an example, some computer-generated reality devices incorporate a near eye display that is worn by the user and moves in unison with the user's head. Such devices may output content dependent upon a position and orientation of the user's head.

SUMMARY

One aspect of the disclosure is a method that includes obtaining a first acceleration signal from a first acceleration sensor located in a first headphone device and obtaining a second acceleration signal from a second acceleration sensor located in a second headphone device. The method also includes determining a head orientation relative to a display screen based on the first acceleration signal and the second acceleration signal. The method also includes controlling rendering of a three-dimensional scene based on the head orientation relative to the display screen, and outputting the three-dimensional scene for display on the display screen.

In some implementations of the method, controlling rendering of the three-dimensional scene based on the head orientation relative to the display screen further comprises modifying a position of a virtual camera relative to the three-dimensional scene based on the head orientation relative to the display screen. In some implementations of the method, controlling rendering of the three-dimensional scene based on the head orientation relative to the display screen further comprises modifying an orientation of a virtual camera relative to the three-dimensional scene based on the head orientation relative to the display screen.

In some implementations of the method, controlling rendering of the three-dimensional scene based on the head orientation relative to the display screen further comprises modifying a position of an object included in the three-dimensional scene relative to the three-dimensional scene based on the head orientation relative to the display screen. In some implementations of the method, controlling rendering of the three-dimensional scene based on the head orientation relative to the display screen further comprises modifying an orientation of an object included in the three-dimensional scene relative to the three-dimensional scene based on the head orientation relative to the display screen.

In some implementations of the method, the head orientation includes a pitch value, a roll value, and a yaw value. In some implementations of the method, determining the head orientation relative to the display screen further comprises tracking motion of the display screen relative to the first headphone device and the second headphone device. Some implementations of the method further comprise obtaining images of the head of a user of the first headphone device and the second headphone device, and determining a head position relative to the display screen based on the images.

In some implementations of the method, controlling rendering of the three-dimensional scene based on the head orientation relative to the display screen is performed by a head-mounted display device that is not worn by a user.

Another aspect of the disclosure is a non-transitory computer-readable storage device including program instructions executable by one or more processors that, when executed, cause the one or more processors to perform operations. The operations include obtaining a first acceleration signal from a first acceleration sensor located in a first headphone device and obtaining a second acceleration signal from a second acceleration sensor located in a second headphone device. The operations also include determining a head orientation relative to a display screen based on the first acceleration signal and the second acceleration signal. The operations also include controlling rendering of a three-dimensional scene based on the head orientation relative to the display screen, and outputting the three-dimensional scene for display on the display screen.

Another aspect of the disclosure is an apparatus that includes a memory, and one or more processors that are configured to execute instructions that are stored in the memory. The instructions, when executed, cause the one or more processors to obtain a first acceleration signal from a first acceleration sensor located in a first headphone device, and obtain a second acceleration signal from a second acceleration sensor located in a second headphone device. The instructions, when executed, further cause the one or more processors to determine a head orientation relative to a display screen based on the first acceleration signal and the second acceleration signal, control rendering of a three-dimensional scene based on the head orientation relative to the display screen, and output the three-dimensional scene for display on the display screen.

DETAILED DESCRIPTION

The disclosure herein relates to displaying content dependent on the motion of the head of a user, in the context of a display that is not worn by the user, such as a display screen that is physically spaced from the user. By utilizing sensors that are included in headphones, sufficient information can be obtained to estimate motion of the head of the user, such as by estimating rotation of the head of the user in three degrees of freedom (e.g., pitch, roll, and yaw rotations). As an example, estimating motion of the head of the user can be performed by estimated the orientation and/or position of the head of the user, and updating this estimate over time (e.g., across multiple time steps, at a predetermined frequency, so forth). The estimated head motion can be used as an input that controls rendering of a three-dimensional scene, such as by controlling the position and/or orientation of a virtual camera with respect to the three-dimensional scene, or by controlling the position and/or orientation of an object in the three-dimensional scene.

Figure 1:
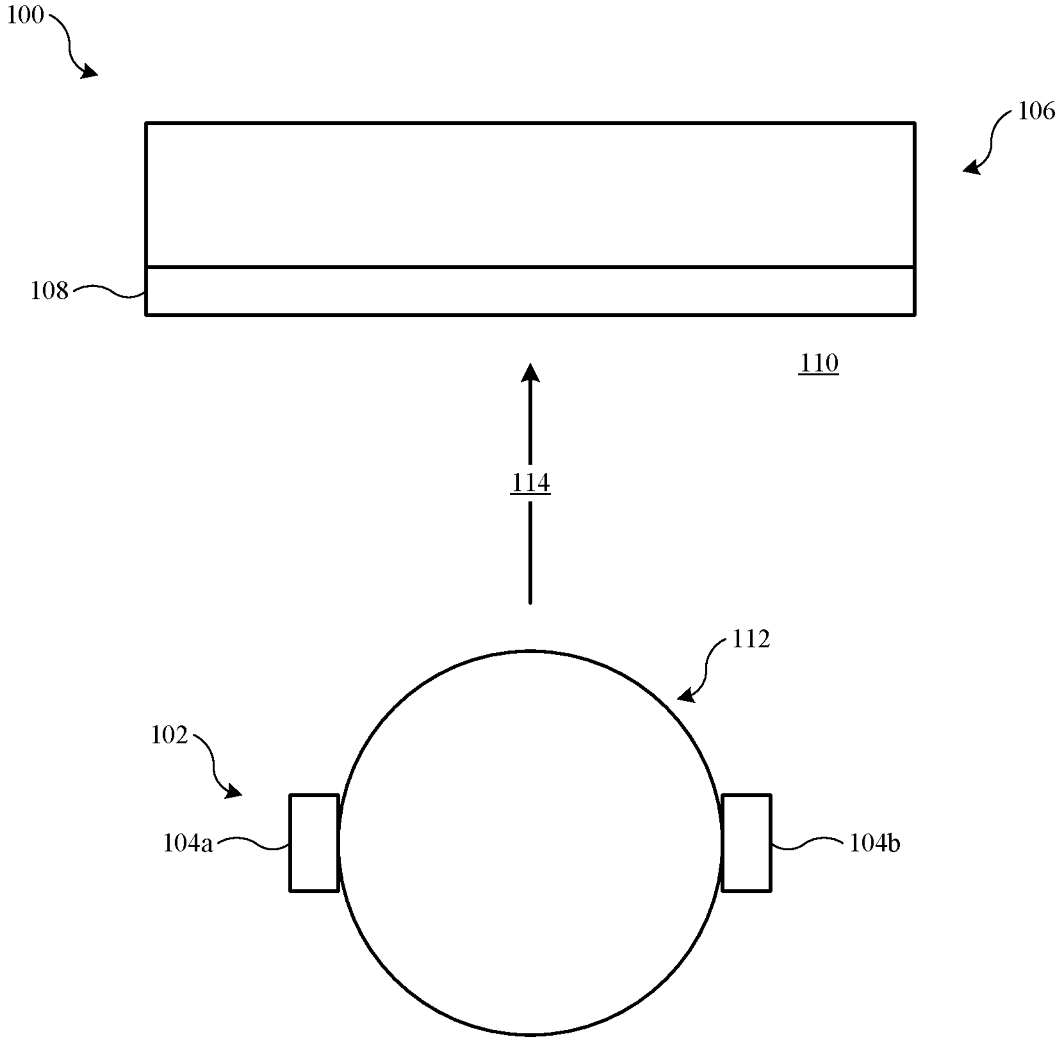
FIG. 1 is a schematic illustration of a system for motion dependent display.

FIG. 1 is a schematic illustration of a system 100 for motion dependent display. The system 100 includes headphones 102 (e.g., a pair of headphones) having a first headphone device 104*a* and a second headphone device 104*b*. The system 100 also includes an external device 106 that includes a display screen 108.

The headphones 102 and the external device 106 are located near one another in an environment 110, which may be referred to as a physical environment or a surrounding environment. The headphones are worn by a user 112 who is located in the environment 110. The user 112 is able to view the display screen 108 of the external device 106. In the illustrated implementation, the user 112 is viewing the display screen 108 according to a view angle 114 that varies according to the position and orientation of the head of the user 112 relative to the display screen 108.

The first headphone device 104*a* and the second headphone device 104*b* may be physically independent wireless headphone devices and may be implemented, for example, as wireless earbuds that are configured to be worn by a user adjacent to their ears, for example, by engagement of each of the first headphone device 104*a* and the second headphone device 104*b*.

The external device 106 is configured to present content to the user 112 using the display screen 108. The content presented to the user 112 may be generated by the external device 106. The external device 106 may be configured to generate visual content dependent on the motion of the first headphone device 104*a* and the second headphone device 104*b*. The visual content generated by the external device may be a rendering of a three-dimensional scene. The external device 106 is further configured to present the visual content to the user 112, such as by outputting the visual content to the display screen 108 of the external device 106. As an example, of generating the visual content dependent on the motion of the first headphone device 104*a* and the second headphone device 104*b*, the rendering of the three-dimensional scene may be modified according to changes in the position and the orientation of the head of the user 112, as estimated using information from the first headphone device 104*a* and the second headphone device 104*b* that describes motion of the first headphone device 104*a* and the second headphone device 104*b*. Generation of the visual content by the external device 106 will be described further herein.

Figure 2:
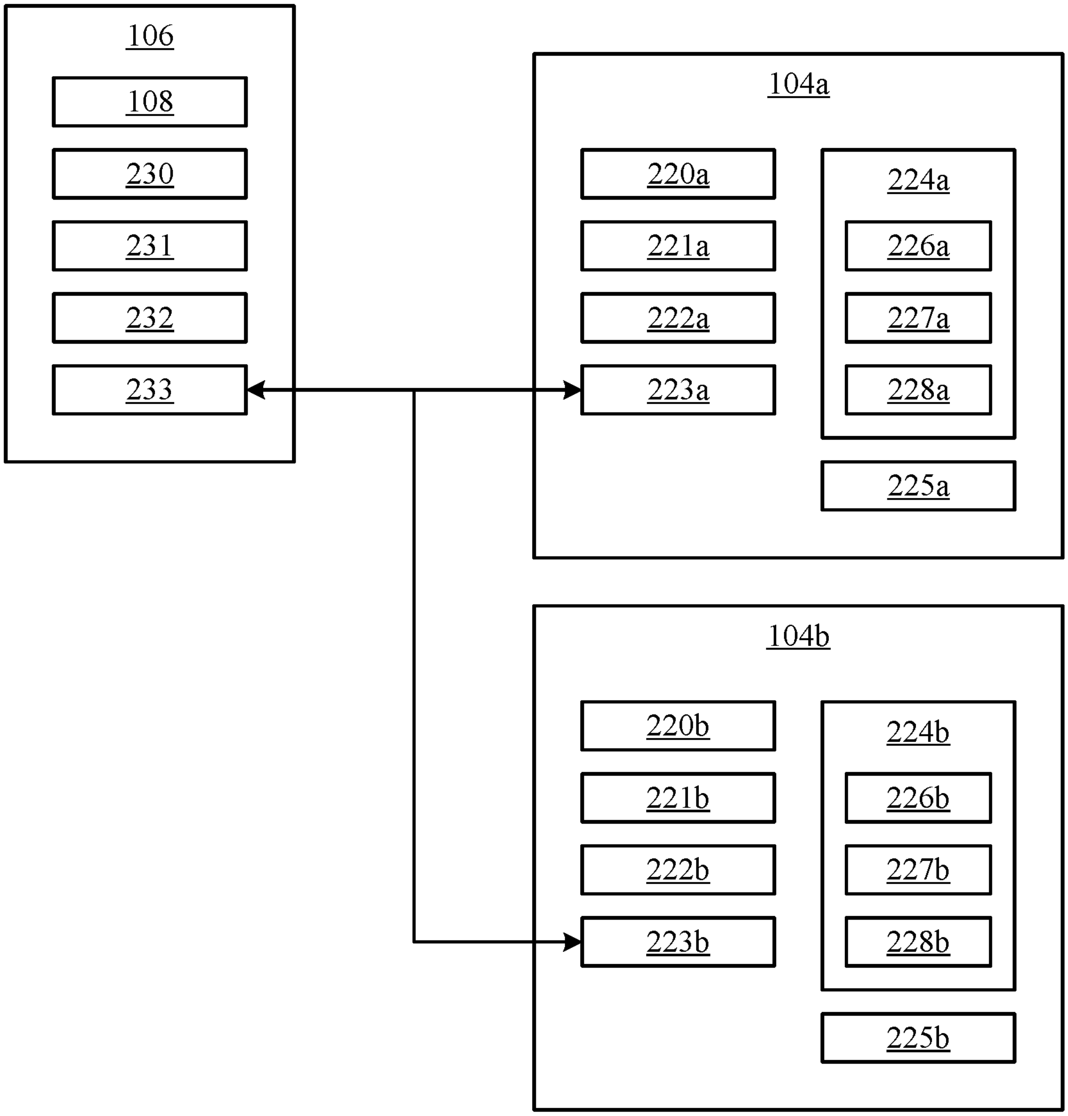
FIG. 2 is a block diagram of an example hardware configuration for a first headphone device, a second headphone device, and an external device.

FIG. 2 is a block diagram showing an example hardware configuration for the first headphone device 104*a*, the second headphone device 104*b*, and the external device 106. As will be described, the first headphone device 104*a*, the second headphone device 104*b*, and the external device 106 may all include independent input devices, output devices, sensors, and/or computing devices. In addition the first headphone device 104*a*, the second headphone device 104*b*, and the external device 106 each include communications capabilities that allow them to transmit signals to each other wirelessly. This allows, for example, playback of audio provided by the external device 106 using the first headphone device 104*a* and the second headphone device 104*b*, as well as control of one or more functions of the external device based on input signals or sensor signals generated at the first headphone device 104*a* and the second headphone device 104*b*.

The first headphone device 104*a* may include a housing 220*a*, an audio output device 221*a*, a communications device 222*a*, a computing device 223*a*, sensors 224*a*, and a power source 225*a* such as a rechargeable battery. Other components may be included in the first headphone device 104*a*.

The housing 220*a* of the first headphone device 104*a* is a physical structure that is configured to physically interconnect and/or enclose the components of the first headphone device 104*a*. The housing 220*a* may have a geometric configuration that allows it to be securely held in a generally fixed position with respect to an ear of the user 112. The audio output device 221*a* (e.g., one or more audio output devices) is configured to generate sound in response to a signal received, for example, from the external device 106. The audio output device 221*a* may be implemented in the form of a conventional loudspeaker or according to another suitable configuration. The audio output device 221*a* is coupled to the housing 220*a* in a manner that positions the audio output device 221*a* near an ear of the user 112 to allow the user 112 to hear the sound that is generated by the audio output device 221*a*. The communications device 222*a* supports wired or wireless communications with other devices, such as the second headphone device 104*b* and the external device 106. The communications device 222*a* may support short range and/or long range communications. Any suitable wired or wireless communications protocol may be used.

The computing device 223*a* is a conventional computing device that is configured to control operation of the first headphone device 104*a*. The computing device 223*a* of the first headphone device 104*a* may be implemented using the computing device 880 of FIG. 8 or another suitable computing device. The computing device 223*a* is configured to implement functions of the first headphone device 104*a*, such as powering up the first headphone device 104*a*, powering down the first headphone device 104*a*, establishing communications (e.g., including pairing) between the first headphone device 104*a*, the second headphone device 104*b*, and the external device 106, receiving an audio signal from the external device 106 using the communications device 222*a*, decoding the audio signal from the external device 106, outputting the audio signal (e.g., the decoded audio signal) to the audio output device 221*a*, and transmitting sensor signals from the sensors 224*a* to the external device 106. These functions and other functions of the first headphone device 104*a* may be implemented using computer program instructions that are available to the computing device 223*a* and, when executed, cause execution of computing processes associated with the functions.

The sensors 224*a* may include a first acceleration sensor 226*a*, one or more gyroscopes 227*a*, and one or more magnetometers 228*a*. As an example, the first acceleration sensor 226*a*, the one or more gyroscopes 227*a*, and the one or more magnetometers 228*a* may be included in a conventional inertial measurement unit.

The second headphone device 104*b* is equivalent to the first headphone device 104*a* and may utilize the configuration described with respect to the first headphone device 104*a*. Thus, the second headphone device may include a housing 220*b* equivalent to the housing 220*a*, an audio output device 221*b* equivalent to the audio output device

221*a*, a communications device 222*b* equivalent to the communications device 222*a*, a computing device 223*b* equivalent to the computing device 223*a*, sensors 224*b* equivalent to the sensors 224*a*, and a power source 225*b* such as a rechargeable battery. The sensors 224*b* may include a second acceleration sensor 226*b*, one or more gyroscopes 227*b*, and one or more magnetometers 228*b*, which are equivalent to the components of the sensors 224*a*. The second acceleration sensor 226*b* is configured to output a second acceleration signal that describes acceleration of the second headphone device 104*b* in one or more degrees of linear freedom and/or in one or more degrees of rotational freedom. As one example, the second acceleration signal may include information describing acceleration of the second headphone device 104*b* in three degrees of linear freedom (e.g., corresponding to acceleration in an XYZ coordinate system).

The external device 106 may include the display screen 108, a computing device 230, an imaging device 231, a three-dimensional sensing device 232, and a communications device 233. The computing device 230 implements computing functions of the external device 106, such as rendering visual content, outputting the visual content to the display screen 108, obtaining images from the imaging device 231, and sending and receiving information to the headphones 102 using the communications device 233. The computing device 230 may be implemented using the computing device 880 of FIG. 8 or another suitable computing device. The imaging device 231 may include, as examples, one or more visible and/or infrared spectrum video cameras or still cameras. The three-dimensional sensing device 232 may include, as examples, one or more lidar, radar, ultrasonic, depth cameras, and/or structured light devices. The communications device is configured to communication with the first headphone device 104*a* and the second headphone device 104*b*, and may be implemented in the manner described with respect to the communications device 222*a* of the first headphone device 104*a*.

Figure 3:
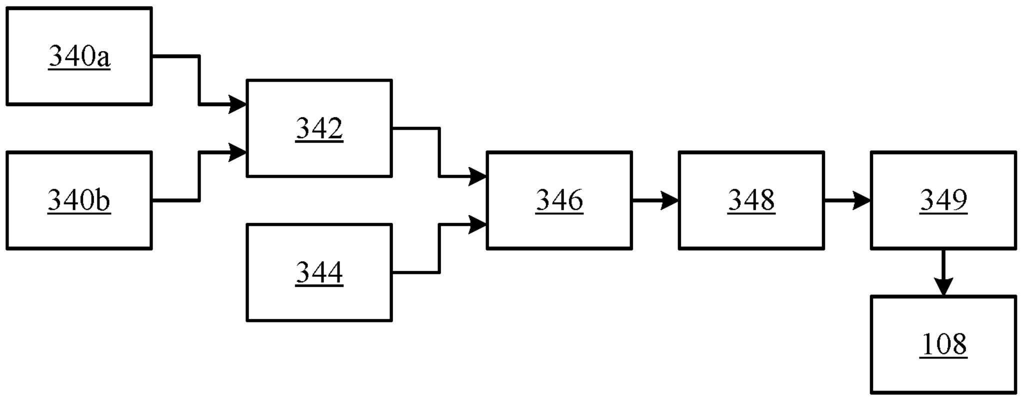
FIG. 3 is a block diagram of operation of the system for motion dependent display.
Figure 4:
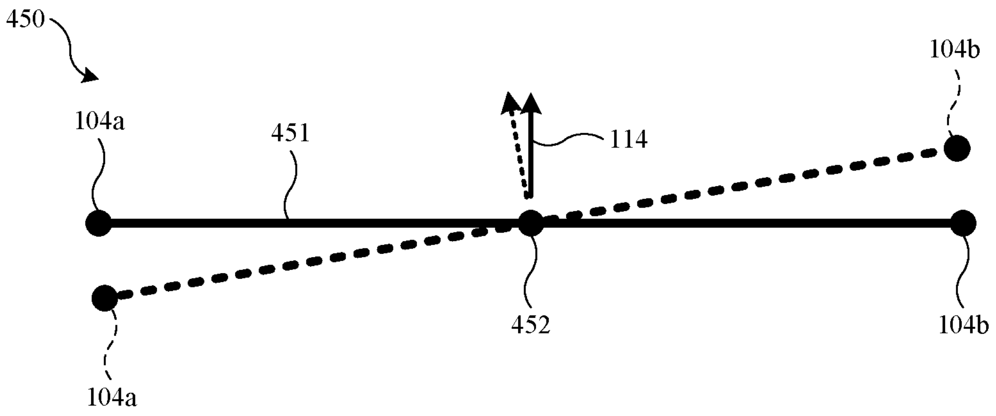
FIG. 4 is a schematic illustration of a geometric model used for head orientation estimation.

FIG. 3 is a block diagram of operation of the system 100 for motion dependent display. The system 100 utilizes a first acceleration signal 340*a* and a second acceleration signal 340*b* as inputs. A head pose estimate 342 is determined based on the first acceleration signal 340*a* and the second acceleration signal 340*b* and is applied to a three-dimensional scene 344 to determine a modification 346 to the three-dimensional scene 344. Subsequent to application of the modification 346, a renderer 348 processes the three-dimensional scene 344 to generate an output 349. The output 349 is visual content, such as an image (e.g., a two-dimensional digital image, which may be a frame from a sequence of frames) or multiple images, that are generated based on the three-dimensional scene 344, and which may be generated using conventional rendering techniques. The output 349 may be presented to the user 112, for example, by providing a signal that causes the output 349 to be displayed to the user 112 by the display screen 108 or by another suitable display device.

The first acceleration signal 340*a* is output by the first acceleration sensor 226*a* of the first headphone device 104*a*, and the second acceleration signal 340*b* is output by the second acceleration sensor 226*b* of the second headphone device 104*b*. The first acceleration signal 340*a* that is output by the first acceleration sensor 226*a* describes acceleration of the first headphone device 104*a* in one or more degrees of linear freedom and/or in one or more degrees of rotational freedom, and the second acceleration signal 340*b* that is output by the second acceleration sensor 226*b* describes acceleration of the second headphone device 104*b* in one or more degrees of linear freedom and/or in one or more degrees of rotational freedom.

The first acceleration signal 340*a* and the second acceleration signal 340*b* may include information describing linear acceleration of the first headphone device 104*a* and the second headphone device 104*b*, respectively, in three degrees of linear freedom. For ease of reference, the three linear degrees of freedom may be described as corresponding an XYZ coordinate system having a longitudinal direction X, a lateral direction Y, and an elevational direction Z. A separate coordinate system may be used for each of the first headphone device 104*a* and the second headphone device 104*b*, referenced relative to the location of the first acceleration sensor 226*a* and the second acceleration sensor 226*b*, respectively, or referenced relative to another portion of the first headphone device 104*a* or the second headphone device 104*b*, respectively. Thus, the first acceleration signal 340*a* and the second acceleration signal 340*b* may each describe linear acceleration in the longitudinal direction X, linear acceleration in the lateral direction Y, and linear acceleration in the elevational direction Z.

In some implementations, the first acceleration signal 340*a* and second acceleration signal 340*b* may also include information describing rotational accelerations of the first headphone device 104*a* and the second headphone device 104*b*, respectively, in one or more degrees of rotational freedom. As an example the each of the first acceleration signal 340*a* and the second acceleration signal 340*b* may describe roll acceleration around an axis that extends in the longitudinal direction X, pitch acceleration around a pitch axis that extends in the lateral direction Y, and yaw acceleration around an axis that extends in the elevational direction Z. The signals may be referenced relative to axes that are specific to each of the first headphone device 104*a* and the second headphone device 104*b*, such as respective pitch, roll, and yaw axes that extend through each of the first acceleration sensor 226*a* and the second acceleration sensor 226*b*, respectively.

The head pose estimate 342 is a determination of an estimate of a head orientation (e.g., represented by the view angle 114) of the user 112 relative to the display screen 108 based on the first acceleration signal 340*a* and the second acceleration signal 340*b*. The head pose estimate 342 may also include an estimate of the position (e.g., with respect to a linear coordinate system) of the head of the user 112 with respect to the display screen 108.

The head pose estimate 342 may be determined by assuming relative positions of the first headphone device 104*a*, second headphone device 104*b*, and the head of the user 112. The first headphone device 104*a* and the second headphone device 104*b* are assumed to be worn by the user 112, for example, with the first headphone device 104*a* positioned adjacent to the user's left ear, and with the second headphone device 104*b* adjacent to the user's right ear. As a result, the positions of the first headphone device 104*a* and the second headphone device 104*b* are assumed to be fixed with respect to the user's head and therefore at a fixed relative position with respect to each other. As an example, a distance between the first headphone device 104*a* and the second headphone device 104*b* can be a predetermined assumed value, a measured value, a value provided by a user input, so forth.

By assuming relative positions for the first headphone device 104*a* and the second headphone device 104*b*, movement of the head of the user 112 can be estimated by modelling the locations of the first headphone device 104*a* and the second headphone device 104*b* (e.g., the locations being represented by locations of the first acceleration sensor 226*a* and the second acceleration sensor 226*b*) as points on a rigid body. When tracking begins, initial positions of the first headphone device 104*a* and the second headphone device 104*b* with respect to the display screen 108 of the external device 106 are set. The initial positions correspond to the view angle 114 being directed to the center of the display screen 108. As an example, to calibrate the initial positions, the user 112 may be directed (e.g., by a visual prompt or audible prompt output by the external device 106) to look directly at the display screen 108 when tracking commences, and the initial positions may be updated during use of the system 100, such as by resetting the view angle 114 to correspond to the center of the display screen 108 when the user 112 presses a button that indicates that the view angle 114 is centered. During tracking of the view angle 114 relative to the display screen 108, the first acceleration signal 340*a* and the second acceleration signal 340*b* are used to iteratively update the velocity and position of each of the first headphone device 104*a* and the second headphone device 104*b*, which allows calculation of an estimate of the view angle 114.

In the illustrated implementation, which is a schematic top-down view, a geometric model 450 is used to estimate motion of the head of the user 112 and the view angle 114 of the user 112. In the geometric model 450, the head of the user 112 is modeled as a rigid beam 451 having a center of yaw rotation 452 that is located between the first headphone device 104*a* and the second headphone device 104*b*. An initial position of the rigid beam 451 at the beginning of a time period is depicted as a solid line, and a final position of the rigid beam 451 at the end of the time period is depicted as a dashed line.

At the beginning of the time period, the first headphone device 104*a* is located at an initial position and has an initial velocity v_1*i*, and the second headphone device 104*b* is located at an initial position and has an initial velocity v_2*i*. During the time period, an acceleration a_1 of the first headphone device 104*a* is determined based on the first acceleration signal 340*a*, for example, as an average value of the first acceleration signal 340*a* during the time period. Similarly, during the time period, an acceleration a_2 of the second headphone device 104*b* is determined based on the second acceleration signal 340*b*, for example, as an average value of the second acceleration signal 340*b* during the time period.

Using standard motion equations, the position of the first headphone device 104*a* at the end of the time period and a final velocity v1_f of the first headphone device 104*a* at the end of the time period are determined based on the initial position of the first headphone device 104*a*, the initial velocity v_1*i* of the first headphone device 104*a*, the acceleration a_1 of the first headphone device 104*a* during the time period, and the duration of the time period. Similarly, the position of the second headphone device 104*b* at the end of the time period and a final velocity v2_f of the second headphone device 104*b* at the end of the time period are determined based on the initial position of the second headphone device 104*b*, the initial velocity v_2*i* of the second headphone device 104*b*, the acceleration a_1 of the second headphone device 104*b* during the time period, and the duration of the time period.

The final positions for the first headphone device 104*a* and the second headphone device 104*b* are used to determine an updated position for the rigid beam 451 and the center of yaw rotation 452 thereof at the end of the time period. The view angle 114 is given by the angle of the rigid beam 451, which is determined based on the final positions of the first headphone device 104*a* and the second headphone device 104*b*. This is a simple geometric construction since the locations of the first headphone device 104*a*, the second headphone device 104*b*, and the center of yaw rotation 452 are assumed to be fixed relative to each other is this estimate.

This estimation process described above results in an update to the head pose estimate 342 for the yaw rotation axis. In some implementations, the position of the head (e.g., in the longitudinal direction X and the lateral direction Y) may be updated according to the change in position of the center of yaw rotation 452 as reflected in the above-described estimation. In other implementations, the translational position of the user's head is assumed to be fixed, and the position of the center of yaw rotation 452 is not updated.

Although the description above is made with respect to estimation of yaw rotation for ease of explanation, the process may be expanded to consider other degrees of freedom and thereby generate updates to the head pose estimate 342 for the pitch rotation axis and for the yaw rotation axis. The estimated change in position of the user's head may also be determined and tracked according to estimated changes in location of the centers of rotation for the pitch, roll, and yaw axes. Thus, the head orientation of the user 112 that is estimated and included in the head pose estimate 342 may include a pitch value, a roll value, and a yaw value. Further, although the estimate described above models the head of the user 112 geometrically as a beam that extends between the first headphone device 104*a* and the second headphone device 104*b*, the estimate may be conducted by modelling the head of the user in a different way, such as by modelling the head of the user 112 as a plane in which the pitch and yaw axes of the first headphone device 104*a* and the second headphone device 104*b* extend, or by modelling the head of the user 112 as a three dimensional system having a joint structure that mimics movement of a typical human head.

In some implementations, determining the head pose estimate 342 relative to the display screen 108 further includes determining tracking motion of the display screen 108 relative to the first headphone device 104*a* and the second headphone device 104*b*. As an example, the external device 106 that incorporates the display screen 108 may be movable. As an example, the external device 106 may be a handheld device that can be held by the user 112. To track movement of the display screen 108, the external device may include sensors equivalent to those described with respect to the first headphone device 104*a* and the second headphone device 104*b*, such as one or more accelerometers, which can be used to estimate changes in position of the external device 106 and the display screen 108 in the manner described with respect to the first headphone device 104*a* and the second headphone device 104*b*, or in another suitable manner.

In some implementations of the system 100, estimation of the head orientation using the first acceleration sensor 226*a* of the first headphone device 104*a* and the second acceleration sensor 226*b* of the second headphone device 104*b* is combined with determining the translational position of the head of the user 112 relative to the display screen 108 using images and or three-dimensional scan data obtained by the external device 106. As an example, images of the head of the user 112 of the first headphone device 104*a* and the second headphone device 104*b* may be obtained using the imaging device 231 of the external device 106. Using machine vision techniques, the head of the user 112 is identified in the images and the location of the head in the images is tracked using geometric techniques, a trained machine learning-based model, and/or or another suitable technique. As another example, three-dimensional scan data of the head of the user 112 of the first headphone device 104*a* and the second headphone device 104*b* may be obtained using the three-dimensional sensing device 232 of the external device 106. Using machine vision techniques, the head of the user 112 is identified in the three-dimensional scan data and the location of the head in the images is determined tracked using geometric techniques, a trained machine learning-based model, and/or or another suitable technique.

Figure 5:
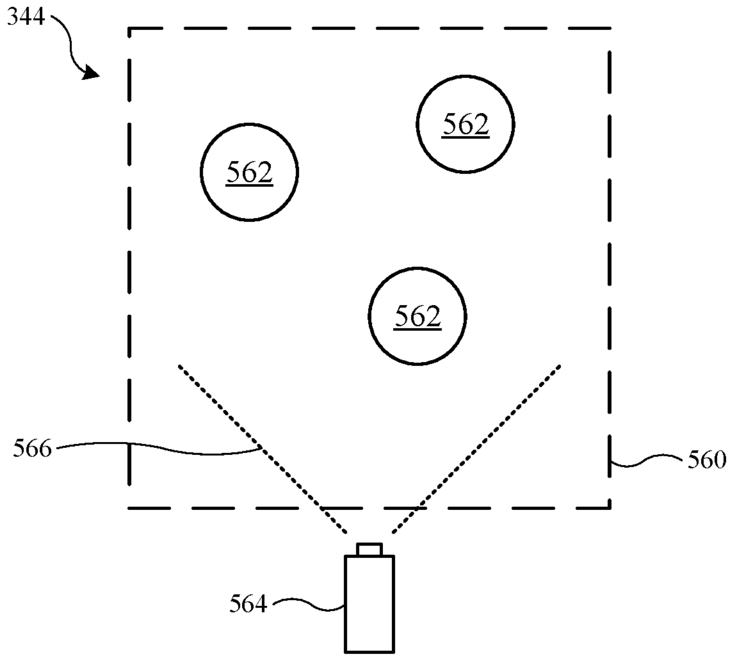
FIG. 5 is a schematic illustration of rendering of a three-dimensional scene.

The head pose estimate 342, including the head orientation of the user 112 relative to the display screen 108, is used to control rendering of the three-dimensional scene 344. Subsequent to determination of the head pose estimate 342, the head pose estimate 342 is applied to the three-dimensional scene 344 to determine a modification 346 to the three-dimensional scene 344. FIG. 5 is a schematic illustration of rendering of the three-dimensional scene 344. In the illustrated implementation, the three-dimensional scene 344 includes a virtual environment 560, and objects 562 that are present in the virtual environment 560. A virtual camera 564 is oriented toward the virtual environment 560. The virtual camera 564 represents a position from which images of the three-dimensional scene 344 will be rendered. The virtual camera 564 has a field of view 566 that is oriented such that some or all of the objects 562 are included in the field of view 566 and therefore will be present in images that are rendered from the point of view of the virtual camera 564.

To control rendering of the three-dimensional scene 344 based on the head pose estimate 342, the position and/or orientation of the virtual camera 564 may be modified based on the head pose estimate 342. The position and/or orientation of the virtual camera 564 may be controlled based on the current values for the head pose estimate 342 (e.g., estimated position and orientation) or may be controlled based on changes in the values for the head pose estimate 342 by comparison of the difference between current values for the head pose estimate 342 relative to previous values for the head pose estimate 342.

The orientation of the virtual camera 564 may be based on the current rotational orientation of the head of the user 112 from the head pose estimate 342, as represented by the view angle 114. As one example, the rotational orientation of the virtual camera 564 may be set to match the current rotational orientation of the head of the user 112. As another example, the rotational orientation of the virtual camera 564 may be changed in accordance with the current rotational orientation of the head of the user 112 (e.g., matched, scaled linearly, or related by a non-linear function). Thus, as an example, when the user 112 rotates their head to the left or right in the yaw direction, the virtual camera 564 may rotate left or right in the yaw direction. As another example when the user 112 rotates their head up or down in the pitch direction, the virtual camera 564 may rotate up or down in the pitch direction. As another example when the user 112 rotates their head clockwise or anticlockwise in the roll direction, the virtual camera 564 may rotate clockwise or anticlockwise in the roll direction.

The translational position of the virtual camera 564 may be based on the current rotational orientation of the head of the user 112 from the head pose estimate 342, as represented by the view angle 114. As one example, the current rotational orientation of the head of the user 112 may be used to translate the virtual camera 564 away from a neutral position in the lateral direction relative to the three-dimensional scene 344. When the view angle 114 of the head of the user 112 is centered on the display screen 108, the virtual camera 564 is in the neutral position. As the view angle 114 moves away from center in the yaw direction, the virtual camera 564 is translated away from the neutral position by translation to the left or the right in the lateral direction, and the virtual camera 564 returns to the neutral position when the view angle 114 is once again centered on the display screen 108. As another example, the current rotational orientation of the head of the user 112 may be used to translate the virtual camera 564 away from a neutral position in the elevational direction relative to the three-dimensional scene 344. When the view angle 114 of the head of the user 112 is centered on the display screen 108, the virtual camera 564 is in the neutral position. As the view angle 114 moves away from center in the pitch direction, the virtual camera 564 is translated away from the neutral position by movement upward or downward in the elevational direction relative to the three-dimensional scene 344, and the virtual camera 564 returns to the neutral position when the view angle 114 is once again centered on the display screen 108.

The orientation and translational position of the virtual camera 564 may be controlled simultaneously based on the current rotational orientation of the head of the user 112 from the head pose estimate 342, as represented by the view angle 114. As an example, the virtual camera 564 can be orbited around a point (e.g., a fixed point) in the three-dimensional scene 344. When the virtual camera 564 is orbited around the point in the three-dimensional scene the virtual camera 564 remains at a constant distance relative to the point, and changes orientation so that it remains oriented toward the point, which simultaneous translates the virtual camera 564 in three degrees of linear freedom and rotates the virtual camera 564 in three-degrees of rotational freedom, which may be controlled based only on the orientation of the head of the user 112, which is a three degree of freedom input.

The translational position of the virtual camera 564 may optionally be controlled based on the translational position of the head of the user 112. As an example, the translational position of the camera may be controlled according to the translational position of the head of the user 112 in any or all of the lateral direction, the longitudinal direction, and the elevational direction. As another example, the translational position and rotational position of the virtual camera 564 may be controlled according to the translational position of the head of the user 112, by translating the virtual camera 564 relative to the three-dimensional scene 344 in correspondence to translation of the head of the user 112 relative to the display screen 108, while controlling rotation of the virtual camera 564 so that the virtual camera 564 remains rotationally oriented toward a point (e.g., a fixed point) in the three-dimensional scene 344.

As one example, the rotational orientation of the virtual camera 564 may be set to match the current rotational orientation of the head of the user 112. As another example, the rotational orientation of the virtual camera 564 may be changed in accordance with the current rotational orientation of the head of the user 112 (e.g., matched, scaled linearly, or related by a non-linear function). Thus, as an example, when the user 112 rotates their head to the left or right in the yaw direction, the virtual camera 564 may rotate left or right in the yaw direction. As another example when the user 112 rotates their head up or down in the pitch direction, the virtual camera 564 may rotate up or down in the pitch direction. As another example when the user 112 rotates their head clockwise or anticlockwise in the roll direction, the virtual camera 564 may rotate clockwise or anticlockwise in the roll direction. As another example, the virtual camera 564 may be orbited around a fixed point in the three-dimensional scene 344 based on translation of the head of the user 112 without regard to the angular orientation of the head of the user. As another example, the virtual camera 564 may be translated relative to the three-dimensional scene 344 in correspondence with translation of the head of the user 112 and the virtual camera 564 may be simultaneously rotated in correspondence with the rotational orientation of the head of the user 112.

As another example, rendering of the three-dimensional scene 344 may be controlled based on the motion of the head of the user 112 by modification of the position and/or orientation of one or more of the objects 562 in the virtual environment 560 based on the head pose estimate 342. As an example, upon selection of one or more of the objects 562, translation of the head of the user 112 may cause translation of the objects 562, rotation of the head of the user 112 may cause translation of the objects 562, or rotation of the head of the user 112 may cause rotation of the objects 562.

The foregoing are examples of ways that rendering of the three-dimensional scene 344 may be controlled based on the head pose estimate 342. It should be understood that other ways of controlling the position and pose of the objects 562 and/or the virtual camera 564 can be implemented. It should also be understood that the foregoing examples can be combined in various ways.

The three-dimensional scene 344, as modified in the manner described with respect to the modification 346, is provided to the renderer 348. The renderer 348 processes the three-dimensional scene 344 to generate the output 349. As an example, using conventional computer graphics techniques, the renderer 348 may generate an image or a series of images of the three-dimensional scene 344 from the perspective of the virtual camera 564. As an example, the output 349 is generated from the location of the virtual camera 564 according to the field of view 566 of the virtual camera 564, and may be generated subject to visual settings that are associated with the virtual camera 564. The output 349 may be presented to the user 112, for example, by providing a signal that causes the output 349 to be displayed to the user 112 by the display screen 108 or by another suitable display device, thereby presenting a representation of the three-dimensional scene 344 to the user 112.

Figure 6:
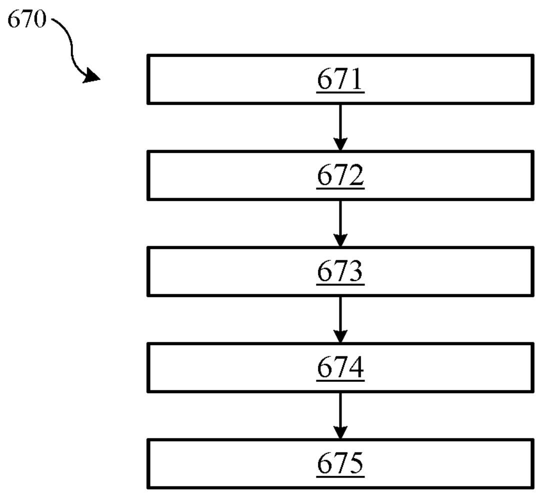
FIG. 6 is a block diagram of a process for motion dependent display.

FIG. 6 is a block diagram of a process 670 for motion dependent display. The process 670 may be implemented in the context of the system 100. As an example, the process 670 or portions of the process 670 may be implemented by one or more computing devices from the headphones 102 and/or the external device 106, such as the device 223*a* of the first headphone device 104*a*, the device 223*b* of the second headphone device 104*b*, or the computing device 230 of the external device 106. The computing devices of these systems may be configured to perform the operations of the process 670, for example, using the example implementation of a computing device 880 of FIG. 8. As an example, the process 670 the steps thereof may be implemented in the form of computer program instructions that are executable by one or more computing devices, wherein the instructions, when executed by the one or more computing devices, cause the one or more computing devices to perform functions that correspond to the steps of the process. As an example, the process 670 and the steps thereof may be implemented in the form of a non-transitory computer-readable storage device including program instructions executable by one or more processors that, when executed, cause the one or more processors to perform operations that correspond to the steps of the process 670.

Operation 671 includes obtaining sensor information. Operation 671 includes obtaining information from the first headphone device 104*a* and the second headphone device 104*b*. The sensor information obtained may include information from any of the sensors 224*a* from the first headphone device 104*a* and information from any of the sensors 224*b* from the second headphone device 104*b*.

Operation 671 includes obtaining information that describes motion of the first headphone device 104*a* and the second headphone device 104*b* from one or more sensors that are associated with the first headphone device 104*a* and the second headphone device 104*b*. As an example, operation 671 may include obtaining the first acceleration signal 340*a* from the first acceleration sensor 226*a* that is located in the first headphone device 104*a*, and obtaining the second acceleration signal 340*b* from the second acceleration sensor 226*b* that is located in the second headphone device 104*b*.

Operation 671 may include obtaining additional sensor information. As an example, operation 671 may include obtaining sensor information from the gyroscopes 227*a* and the gyroscopes 227*b* of the first headphone device 104*a*, and may include obtaining sensor information from the magnetometers 228*b* and the gyroscopes 227*b* of the second headphone device 104*b*. As another example, operation 671 may include obtaining one or more images form the imaging device 231 of the external device 106 and/or may include obtaining three-dimensional sensor data (e.g., a three-dimensional point cloud or other three-dimensional sensor information) from the three-dimensional sensing device 232 of the external device 106. As another example, operation 671 may include obtaining information that describes motion of the external device 106, for example, including one or more acceleration signals output by one or more accelerometers that are included in the external device 106.

Operation 672 includes determining a head orientation for the head of the user 112. Operation 672 may also include determining a head position for the head of the user 112. The head orientation for the head of the user 112 may correspond to the view angle 114. The user 112 is the user of the first headphone device 104*a* and the second headphone device 104*b*, and the head orientation of the user 112 may be determined using the sensor information obtained from the sensors 224*a* of the first headphone device 104*a* and the sensors 224*b* of the second headphone device 104*b* as described with respect to operation 671. In some implementations, operation 672 includes determining the head orientation for the head of the user 112 relative to the display screen 108 of the external device 106 based on the first acceleration signal 340*a* from the first acceleration sensor 226*a* of the first headphone device 104*a* and based on the second acceleration signal 340*b* from the second acceleration sensor 226*b* from the second headphone device 104*b*. In some implementations, determining the head orientation of the user 112 and determining the head position of the user relative to the display screen 108 further comprises tracking motion of the display screen 108 relative to the first headphone device 104*a* and the second headphone device 104*b*. In some implementations, determining the head position of the user 112 includes obtaining images of the head of user 112, for example, using the imaging device 231 of the external device 106, and determining the head position relative to the display screen 108 based on the images, as previously described.

In operation 672, the head orientation for the head of the user 112 and/or the head position for the head of the user 112 may be determined in the manner described with respect to determination of the head pose estimate 342. The head pose estimate 342 may include an estimated head orientation relative to the display screen 108 of the external device 106, which may include a pitch value, a roll value, and a yaw value. The head pose estimate 342 may include an position of the head of the user 112 relative to the display screen 108 of the external device 106, which may be expressed in linear coordinates, for example, relative to the longitudinal direction X, the lateral direction Y, and the elevational direction A.

Operation 673 includes controlling rendering of the three-dimensional scene 344 based on the head orientation of the head of the user 112 relative to the display screen 108 of the external device 106. Operation 673 may be performed in the manner described with respect to determination of the modification 346, using the head pose estimate 342 and the three-dimensional scene 344 as inputs. Controlling rendering of the three-dimensional scene 344 may include moving the virtual camera 564, moving one or more of the objects 562 of the three-dimensional scene 344, or modifying the virtual environment 560, the objects 562, another portion of the three-dimensional scene 344, and/or the virtual camera 564 in another way. Rendering of the three-dimensional scene 344 may be controlled in operation 673 based on the head pose estimate 342, including the estimated view angle 114 of the head of the user 112 relative to the display screen 108 of the external device 106 and/or the estimated position of the head of the user 112 relative to the display screen 108 of the external device 106.

In some implementations of operation 673, controlling rendering of the three-dimensional scene 344 based on the head orientation relative to the display screen 108 includes modifying a position of the virtual camera 564 relative to the three-dimensional scene 344 based on the head orientation relative to the display screen 108. In some implementations of operation 673, controlling rendering of the three-dimensional scene 344 based on the head orientation relative to the display screen 108 includes modifying an orientation of the virtual camera 564 relative to the three-dimensional scene 344 based on the head orientation relative to the display screen 108.

In some implementations of operation 673, controlling rendering of the three-dimensional scene 344 based on the head orientation relative to the display screen 108 includes modifying a position of one or more of the objects 562 that are included in the three-dimensional scene 344 relative to the three-dimensional scene 344 based on the head orientation relative to the display screen 108. In some implementations of operation 673, controlling rendering of the three-dimensional scene 344 based on the head orientation relative to the display screen 108 further comprises modifying an orientation of one of the objects 562 that are included in the three-dimensional scene 344 relative to the three-dimensional scene 344 based on the head orientation relative to the display screen 108.

Operation 674 includes generating an output representing the three-dimensional scene 344. Operation 674 can be performed in the manner described with respect to the renderer 348 and the output 349. Operation 675 includes outputting the three-dimensional scene 344 for display on the display screen 108 of the external device 106. As an example the three-dimensional scene 344 may be output to the external device 106 in the form of the output 349 such as one or more images generated by the renderer 348 based on the three-dimensional scene 344.

Figure 7:
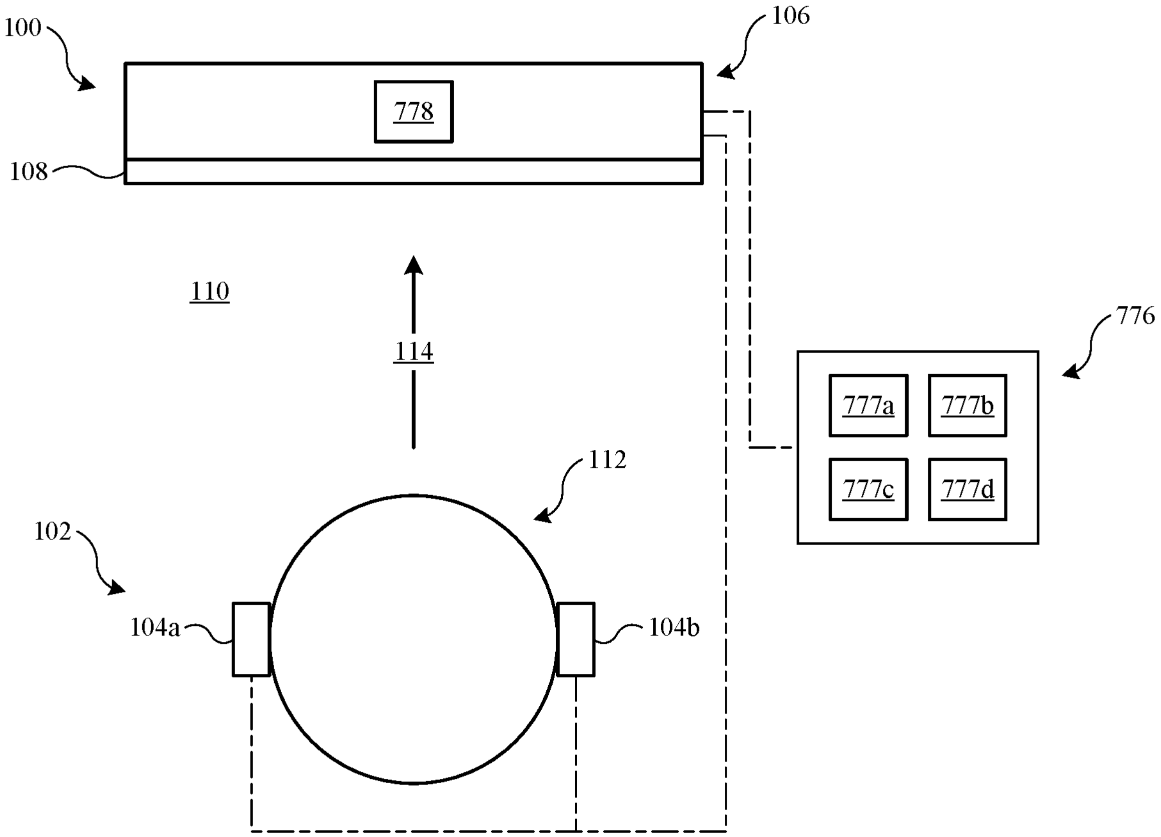
FIG. 7 is a block showing an example of usage of the motion dependent display system.

FIG. 7 is a block showing an example of usage of the motion dependent display system in conjunction with a head-mounted display device 776. Except as described in this example to the contrary operation of the system 100, inclusive of the headphones 102 and the external device 106, is as previously described.

The head-mounted display device 776 is a device that is intended to be worn on the head of a user in order to present content to the user from a near-eye display system that includes display elements placed closed to the user's eyes and at a fixed position with respect thereto. As an example, the head-mounted display device 776 may include a computing device 777*a*, sensors 777*b*, and a near-eye display system comprising, for example, a display screen 777*c* and an optical system 777*d*. These components may be incorporated into a housing that is supported relative to a user (e.g., worn by the user on their head) by conventional components such as a flexible headband, a rigid or semi-rigid halo type support, and so forth.

The computing device 777*a* is operable to execute computer program instructions and may do so to generate content (e.g., including rendering), and to cause that content to be output for display to the user via the display screen 777*c* and the optical system 777*d*. The computing device 777*a* may be implemented according to the device 880 of FIG. 8, or according to another suitable configuration. The sensors 777*b* may be utilized by the computing device 777*a* during generation of content, such as by supplying motion information to the computing device 777*a* that describes motion of the head-mounted display device 776. As an example, the sensors 777*b* may include one or more accelerometers (e.g., incorporated in one or more inertial measurement units) that are configured to output acceleration signals, where the motion information includes the acceleration signals, and optionally includes other motion-related information. The display screen 777*c* may be a light-emitting display device of a conventional type, such as an LED display screen or an OLED display screen. The optical system 777*d* is positioned adjacent to the display screen 777*c* and is exposed to the light emitted by the optical system 777*d* in order to cause the emitted light to be directed in toward the eyes of a user in order to allow the user to perceive the content generated and output by the head-mounted display device 776.

In this implementation, an integrated development environment 778 is used in conjunction with the external device 106. The integrated development environment 778 is a software application that is executable by a computing device, such as the computing device 230 in the illustrated implementation, and is usable by the user 112 to develop and test a subject software application that is being developed (e.g., by defining computer program instructions and other assets for the subject software application). The integrated development environment 778 may be equivalent to known systems of this type and may include conventional features.

During development of the subject software application, a testing feature of the development environment 778 may be executed. The testing feature causes the subject software application to be prepared for deployment to the head-mounted display device 776 (e.g., such as by compiling software instructions of the subject software devices and/or performing other conventional operations). Once prepared for execution by the head-mounted display device 776, the subject software application is transmitted to the head-mounted display device 776, for example, by a wired communications connection between the external device 106 and the head-mounted display device 776, or by a wireless communications connection between the external device 106 and the head-mounted display device 776. Once the subject software application is received by the head-mounted display device 776, it is executed by the computing device 777*a* of the head-mounted display device 776 in order to generate visual content and optionally audio content corresponding to the subject software application.

The system 100 allows the user to test functionality of the subject software application while it is being executed by the computing device 777*a* of the head-mounted display device 776, but without requiring the user 112 to wear the head-mounted display device 776 during the testing. Accordingly, the visual content generated by the head-mounted display device 776 is not presented to the user 112 during testing using the display screen 777*c* and the optical system 777*d* of the head-mounted display device 776 if the user 112 chooses not to wear the head-mounted display device 776 and audio content generated by the head-mounted display device 776 may not be presented to the user 112 by an audio device incorporated in the head-mounted display device 776 during testing if the user 112 chooses not to wear the head-mounted display device 776. Instead, the content is generated by the computing device 777*a* of the head-mounted display device 776, and is output to the user by the external device 106 and optionally by the headphones 102 during testing.

During testing, visual content may be generated by the computing device 777*a* of the head-mounted display device 776 based on execution of the subject software application by the computing device 777*a*. The visual content is transferred from the head-mounted display device 776 to the external device 106 using the wired or wireless connection and is output by the display screen 108 of the external device 106 (e.g., utilizing functionality of the integrated development environment). Audio content generated at the head-mounted display device 776 based on the subject software application may also be transferred to the external device 106 and output by an audio device thereof, or may be transferred from the external device 106 to the headphones 102 (e.g., using a wireless data connection).

Because the head-mounted display device 776 is not being worn by the user 112 during testing, the head-mounted display device 776 cannot utilize motion information from the sensors 777*b*. To provide motion information to the head-mounted display device 776 during execution of the subject software application, the motion information is determined based on information from the headphones 102, including the acceleration signals output by the first acceleration sensor 226*a* of the first headphone device 104*a* and the second acceleration sensor 226*b* of the second headphone device 104*b*. Thus, the headphones 102 are used to emulate the motion information that would be output by the sensors 777*b* of the head-mounted display device 776 if the head-mounted display device 776 were being worn by the user. Estimation of the motion of the headphones 102 is determined in the manner described previously herein, for example, with respect to the process 670.

Thus, for example, this implementation may include determining the head orientation of the user 112 relative to the display screen 108 based on the first acceleration sensor 340*a* and the second acceleration sensor 340*b*, and providing the head orientation to the head-mounted display device 776 as an input for use in rendering content, where the head-mounted display device 776 is separate from the headphones 102 and the display screen 108. Therefore, controlling rendering of a three-dimensional scene based on the head orientation of the user 112 relative to the display screen 108 may be performed by the head-mounted display device 776, which is not worn by the user 112.

Figure 8:
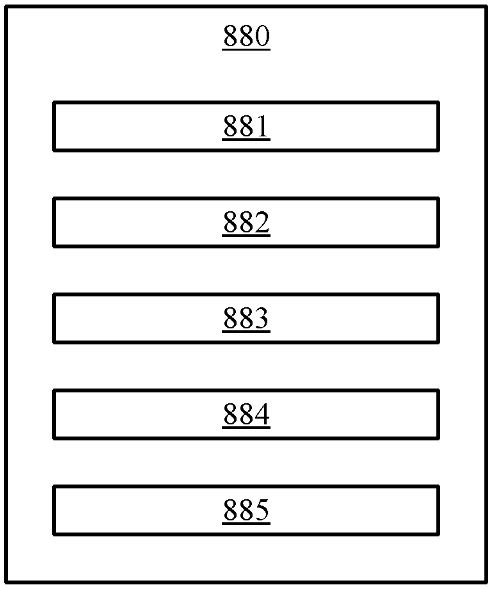
FIG. 8 is a block diagram of an example of a computing device.

FIG. 8 is a block diagram that shows an example of a hardware configuration for the computing device 880, which can be used to implement devices that are described herein, such as the computing device 223*a* of the first headphone device 104*a*, the computing device 223*b* of the second headphone device 104*b*, the computing device 230 of the external device 106, and the device 777*a* of the head-mounted display device 776. The devices that are described herein may include all of the components of the computing device 880, or may include a subset of the components of the computing device 880. In the illustrated implementation, the computing device 880 includes one or more processors 881, a memory 882, a storage device 883, input/output devices 884, and human interface devices 885.

The one or more processors 881 are operable to execute computer program instructions and are operable to perform operations that are described by the computer program instructions. The one or more processors 881 may be implemented using one or more conventional devices and/or more or more special-purpose devices. The memory 882 may be one or more volatile, high-speed, short-term information storage devices such as random-access memory modules. The storage device 883 is intended to allow for long term storage of computer-executable program instructions and other data. Examples of suitable devices for use as the storage device 883 include non-volatile information storage devices of various types, such as a flash memory module, a hard drive, or a solid-state drive. The input/output devices 884 allow communication of the computing device 880 with components of the devices described herein and with conventional components, and may include a bus, a wired interface, a wireless interface, or other interface by which devices can communicate.

In some implementations, the computing device 880 includes the human interface devices 885 to allow information to be displayed to and/or received from a person, such as the user 112. As an example, the human interface devices 885 may include one or more light-emitting display devices, such as a video display of any suitable type, that is able to output images in response to a signal that is received from the one or more processors 881 in order to display content to the user. As another example, the human interface devices 885 may include conventional input devices such as a keyboard, a mouse, a touch-sensitive input device, a non-contact-based gesture input device, buttons, switches, so forth.

In an implementation, a method, comprises obtaining a first acceleration signal from a first acceleration sensor located in a first headphone device; obtaining a second acceleration signal from a second acceleration sensor located in a second headphone device; determining a head orientation relative to a display screen based on the first acceleration signal and the second acceleration signal; controlling rendering of a three-dimensional scene based on the head orientation relative to the display screen; and outputting the three-dimensional scene for display on the display screen.

In an implementation, a non-transitory computer-readable storage device includes program instructions executable by one or more processors that, when executed, cause the one or more processors to perform operations. The operations comprise obtaining a first acceleration signal from a first acceleration sensor located in a first headphone device; obtaining a second acceleration signal from a second acceleration sensor located in a second headphone device; determining a head orientation relative to a display screen based on the first acceleration signal and the second acceleration signal; controlling rendering of a three-dimensional scene based on the head orientation relative to the display screen; and outputting the three-dimensional scene for display on the display screen.

In an implementation, an apparatus comprises a memory and one or more processors that are configured to execute instructions that are stored in the memory. The instructions, when executed, cause the one or more processors to: obtain a first acceleration signal from a first acceleration sensor located in a first headphone device; obtain a second acceleration signal from a second acceleration sensor located in a second headphone device; determine a head orientation relative to a display screen based on the first acceleration signal and the second acceleration signal; control rendering of a three-dimensional scene based on the head orientation relative to the display screen; and output the three-dimensional scene for display on the display screen.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for use in presenting content to a user. The present disclosure contemplates that in some instances, this gathered data may include personal information data that uniquely identifies or can be used to contact or locate a specific person. Such personal information data can include location-based data, images, addresses, so forth. The present disclosure recognizes that the use of such personal information data, in the present technology, can be used to the benefit of users.

Implementers of the present technology should comply with well-established privacy policies and/or privacy practices. For example, such entities should implement and consistently use privacy policies and practices that are generally recognized as meeting or exceeding industry or governmental requirements for maintaining personal information data private and secure. To the extent personal information is collected, the present technology can be configured to allow users to "opt in" or "opt out" of participation. These policies should be easily accessible by users, and should be updated as the collection and/or use of data changes. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

What is claimed is:

1. A method, comprising:

obtaining a first acceleration signal from a first acceleration sensor located in a first headphone device;

obtaining a second acceleration signal from a second acceleration sensor located in a second headphone device;

determining a head orientation relative to a display screen based on the first acceleration signal and the second acceleration signal;

controlling rendering of a three-dimensional scene based on the head orientation relative to the display screen; and outputting the three-dimensional scene for display on the display screen.

2. The method of claim 1, wherein controlling rendering of the three-dimensional scene based on the head orientation relative to the display screen further comprises modifying a position of a virtual camera relative to the three-dimensional scene based on the head orientation relative to the display screen.

3. The method of claim 1, wherein controlling rendering of the three-dimensional scene based on the head orientation relative to the display screen further comprises modifying an orientation of a virtual camera relative to the three-dimensional scene based on the head orientation relative to the display screen.

4. The method of claim 1, wherein controlling rendering of the three-dimensional scene based on the head orientation relative to the display screen further comprises modifying a position of an object included in the three-dimensional scene relative to the three-dimensional scene based on the head orientation relative to the display screen.

5. The method of claim 1, wherein controlling rendering of the three-dimensional scene based on the head orientation relative to the display screen further comprises modifying an orientation of an object included in the three-dimensional scene relative to the three-dimensional scene based on the head orientation relative to the display screen.

6. The method of claim 1, wherein determining the head orientation relative to the display screen further comprises tracking motion of the display screen relative to the first headphone device and the second headphone device.

7. The method of claim 1, wherein the head orientation includes a pitch value, a roll value, and a yaw value.

8. The method of claim 1, further comprising:

obtaining images of a head of a user of the first headphone device and the second headphone device; and determining a head position relative to the display screen based on the images.

9. The method of claim 1, wherein controlling rendering of the three-dimensional scene based on the head orientation relative to the display screen is performed by a head-mounted display device that is not worn by a user.

10. A non-transitory computer-readable storage device including program instructions executable by one or more processors that, when executed, cause the one or more processors to perform operations, the operations comprising:

obtaining a first acceleration signal from a first acceleration sensor located in a first headphone device;

obtaining a second acceleration signal from a second acceleration sensor located in a second headphone device;

determining a head orientation relative to a display screen based on the first acceleration signal and the second acceleration signal;

controlling rendering of a three-dimensional scene based on the head orientation relative to the display screen; and outputting the three-dimensional scene for display on the display screen.

11. The non-transitory computer-readable storage device of claim 10, wherein controlling rendering of the three-dimensional scene based on the head orientation relative to the display screen further comprises modifying a position of a virtual camera relative to the three-dimensional scene based on the head orientation relative to the display screen.

12. The non-transitory computer-readable storage device of claim 10, wherein controlling rendering of the three-dimensional scene based on the head orientation relative to the display screen further comprises modifying an orientation of a virtual camera relative to the three-dimensional scene based on the head orientation relative to the display screen.

13. The non-transitory computer-readable storage device of claim 10, wherein controlling rendering of the three-dimensional scene based on the head orientation relative to the display screen further comprises modifying a position of an object included in the three-dimensional scene relative to the three-dimensional scene based on the head orientation relative to the display screen.

14. The non-transitory computer-readable storage device of claim 10, wherein controlling rendering of the three-dimensional scene based on the head orientation relative to the display screen further comprises modifying an orientation of an object included in the three-dimensional scene relative to the three-dimensional scene based on the head orientation relative to the display screen.

15. The non-transitory computer-readable storage device of claim 10, wherein determining the head orientation relative to the display screen further comprises tracking motion of the display screen relative to the first headphone device and the second headphone device.

16. An apparatus, comprising:

a memory; and one or more processors that are configured to execute instructions that are stored in the memory, wherein the instructions, when executed, cause the one or more processors to:

obtain a first acceleration signal from a first acceleration sensor located in a first headphone device;

obtain a second acceleration signal from a second acceleration sensor located in a second headphone device;

determine a head orientation relative to a display screen based on the first acceleration signal and the second acceleration signal;

control rendering of a three-dimensional scene based on the head orientation relative to the display screen; and output the three-dimensional scene for display on the display screen.

17. The apparatus of claim 16, wherein the instructions to control rendering of the three-dimensional scene based on the head orientation relative to the display screen further comprise instructions to modify a position of a virtual camera relative to the three-dimensional scene based on the head orientation relative to the display screen.

18. The apparatus of claim 16, wherein the instructions to control rendering of the three-dimensional scene based on the head orientation relative to the display screen further comprise instructions to modify an orientation of a virtual camera relative to the three-dimensional scene based on the head orientation relative to the display screen.

19. The apparatus of claim 16, wherein the instructions to control rendering of the three-dimensional scene based on the head orientation relative to the display screen further comprise instructions to modify a position of an object included in the three-dimensional scene relative to the three-dimensional scene based on the head orientation relative to the display screen.

20. The apparatus of claim 16, wherein the instructions to control rendering of the three-dimensional scene based on the head orientation relative to the display screen further comprise instructions to modify an orientation of an object included in the three-dimensional scene relative to the three-dimensional scene based on the head orientation relative to the display screen.

* * * * *